(12) United States Patent
Smith (10) Patent No.: US 6,490,396 B1
(45) Date of Patent: Dec. 3, 2002

(54) OPTICAL WAVEGUIDE FIBER

(75) Inventor: David K. Smith, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 3 days.

(21) Appl. No.: 09/641,580

(22) Filed: Aug. 18, 2000

Related U.S. Application Data (60) Provisional application No. 60/156,768, filed on Sep. 29, 1999, and provisional application No. 60/199,938, filed on Apr. 27, 2000.

(51) Int. Cl.$^7$ .............................. G02B 6/18; G02B 6/16
(52) U.S. Cl. ...................................... 385/123; 385/124
(58) Field of Search .............................. 385/123, 124, 385/126–128

(56) References Cited

U.S. PATENT DOCUMENTS

| | | | |
|---|---|---|---|
| 4,715,679 A | 12/1987 | Bhagavatula | 350/96.33 |
| 5,721,800 A | 2/1998 | Kato et al. | 385/127 |
| 5,748,824 A | 5/1998 | Smith | 385/124 |
| 5,852,701 A | 12/1998 | Kato et al. | 385/127 |
| 5,956,448 A | 9/1999 | Smolka et al. | 385/124 |
| 6,031,956 A | * 2/2000 | Li et al. | 385/123 |
| 6,072,929 A | 6/2000 | Kato et al. | 385/123 |
| 6,078,715 A | 6/2000 | Fujii et al. | 385/124 |
| 6,091,873 A | 7/2000 | Matsuo et al. | 385/123 |
| 6,212,322 B1 | * 4/2001 | Ma et al. | 385/123 |

* cited by examiner

*Primary Examiner*—Hemang Sanghavi
*Assistant Examiner*—Omar Rojas, Jr.
(74) *Attorney, Agent, or Firm*—William J. Chervenak

(57) ABSTRACT

Disclosed is a single mode optical waveguide having a core refractive index profile defined by upper and lower boundary profiles on a chart of relative index percent versus radius. The relative refractive index as a function of radial dimensions of the core are selected to provide an optical waveguide fiber having properties suitable for a high performance telecommunication system operating in the wavelength window of about 1530 nm to 1625 nm. Refractive index profile designs encompassing the wavelength window 1250 nm to 1350 nm are also disclosed. The embodiments of the core waveguide have exceptionally low total dispersion slope and attenuation over these wavelength windows.

21 Claims, 3 Drawing Sheets

OPTICAL WAVEGUIDE FIBER

CROSS-REFERENCE TO RELATED APPLICATIONS

This application claims the benefit of U.S. Provisional Patent Application No. 60/156,768 filed Sep. 29, 1999 and U.S. Provisional Patent Application No. 60/199,938, filed Apr. 27, 2000.

BACKGROUND OF THE INVENTION

The invention is directed to a single mode optical waveguide fiber, more particularly to a waveguide fiber in which the total dispersion is maintained at a low value over a selected wavelength range.

Because of the high data rates and the need for long regenerator spacing, the search for high performance optical waveguide fibers designed for long distance, high bit rate telecommunications has intensified. An additional requirement is that the waveguide fiber be compatible with optical amplifiers, which typically show an optimum gain curve in the wavelength range 1530 nm to 1570 nm. Consideration is also given to the potential of expanding the usable wavelength into the L-Band range of about 1570 nm to 1700 nm, more preferably in the range of about 1570 nm to 1625 nm. Another optical waveguide fiber operating wavelength range is the band that extends from about 1250 nm to 1350 nm. Although attenuation in this lower band is greater in comparison to the higher wavelength windows of operation, this lower wavelength band can provide additional information channels that significantly increase overall system capacity.

In cases where waveguide information capacity is increased by means of wavelength division multiplexing (WDM) technology, an additional waveguide fiber property becomes important. For WDM, high bit rate systems, the waveguide should have exceptionally low, but non-zero, total dispersion over the wavelength range of operation, thereby limiting the non-linear dispersion effect of four wave mixing.

Another non-linear effect that can produce unacceptable dispersion in systems having a high power density, i.e., a high power per unit area, is self phase modulation. Self phase modulation may be controlled by designing a waveguide core which has a large effective area, thereby reducing the power density. An alternative approach is to control the sign of the total dispersion of the waveguide so that the total dispersion of the waveguide serves to counteract the dispersion effect of self phase modulation.

A waveguide having a positive dispersion, where positive means shorter wavelength signals travel at higher speed than those of longer wavelength, will produce a dispersion effect opposite that of self phase modulation, thereby substantially eliminating self phase modulation dispersion.

Such a waveguide fiber is disclosed and described in U.S. patent application Ser. No.08/559,954, incorporated herein in its entirety by reference. The present novel profile improves upon the Ser. No.08/559,954 fiber by increasing effective area. In addition the waveguide of this disclosure has a total dispersion over the wavelength window of operation that is everywhere positive and has a lower limit greater than about 2.0 ps/nm-km to further reduce the power penalty due to four wave mixing.

Thus there is a need for an optical waveguide fiber which:
is single mode over at least the wavelength range 1530 nm to 1570 nm, and preferably over a range that extends to the lower wavelength 1250 nm;

has a zero dispersion wavelength outside the range 1530 nm to 1570 nm;

has a positive total dispersion over the wavelength range 1530 nm to 1625 nm which is not less than about 2.0 ps/nm-km;

has low attenuation, less than about 0.25 dB/km, over the range of about 1570 nm to 1625 nm; and retains the usual high performance waveguide characteristics such as high strength and acceptable resistance to bend induced loss.

The concept of adding structure to the waveguide fiber core by means of core segments, having distinct profiles to provide flexibility in waveguide fiber design, is described fully in U.S. Pat. No. 4,715,679, Bhagavatula. The segmented core concept can be used to achieve unusual combinations of waveguide fiber properties, such as those described herein.

Definitions

The following definitions are in accord with common usage in the art.

The refractive index profile is the relationship between refractive index and waveguide fiber radius. The core refractive index profiles of the invention are described in terms of upper and lower profile boundaries. In addition particular embodiments are described in terms of the relative index $\Delta(r)\%$ (defined below) value at a number of radius points. The points chosen fully describe the refractive index profile in each case.

The radii descriptive of the index profiles disclosed herein appear in the drawings.

The effective area is, $$A_{eff} = 2\pi (\int E^2 r \, dr)^2 / (\int E^4 r \, dr),$$

where the integration limits are 0 to $\infty$, and E is the electric field associated with the propagated light. An effective diameter, $D_{eff}$, may be defined as, $$A_{eff} = \pi (D_{eff}/2)^2.$$

The initials WDM represent wavelength division multiplexing.

The initials SPM represent self phase modulation, a non-linear optical phenomenon wherein a signal having a power density above a specific power level will travel at a different speed in the waveguide relative to a signal below that power density. SPM causes signal dispersion comparable to that of linear dispersion having a negative sign.

The initials FWM represent four wave mixing, the phenomenon wherein two or more signals in a waveguide interfere to produce signals of different frequencies.

The term, $\Delta\%$, represents a relative measure of refractive index defined by the equation, $$\Delta\% = 100 \times (n_i^2 - n_c^2)/2n_i^2,$$

where $n_i$ is the maximum refractive index in region i, unless otherwise specified, and $n_c$ is the average refractive index of the cladding region unless otherwise specified.

The term $\alpha$-profile refers to a refractive index profile, expressed in terms of $\Delta(b)\%$, where b is radius, which follows the equation, $$\Delta(b)\% = \Delta(b_o)(1 - [|b - b_o|/(b_1 b_o)]^\alpha),$$

where $b_o$ is the maximum point of the profile and $b_1$ is the point at which $\Delta(b)\%$ is zero and b is in the range $b_i \leq b \leq b_f$, where Δ% is defined above, $b_i$ is the initial point of the α-profile, $b_f$ is the final point of the α-profile, and α is an exponent which is a real number.

In a computer model of the profile, in order to bring about a smooth joining of the α-profile with the profile of the adjacent profile segment, the equation is rewritten as;

$$\Delta(b)\% = \Delta(b_a) + [\Delta(b_o) - \Delta(b_a)]\{(1 - [|b - b_o|/(b_1 - b_o)]^\alpha)\},$$

where $b_a$ is the first point of the adjacent segment.

The pin array bend test is used to compare relative resistance of waveguide fibers to bending. To perform this test, attenuation loss is measured when the waveguide fiber is arranged such that no induced bending loss occurs. This waveguide fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The waveguide fiber is caused to pass on opposite sides of adjacent pins. During testing, the waveguide fiber is placed under a tension just sufficient to make the waveguide conform to a portion of the periphery of the pins.

Another bend test referenced herein is the lateral load test. In this test a prescribed length of waveguide fiber is placed between two flat plates. A #70 wire mesh is attached to one of the plates. (The market code #70 mesh is descriptive of screen made of wire having a diameter of 0.178 mm. The screen openings are squares of side length 0.185 mm.) A known length of waveguide fiber is sandwiched between the plates and a reference attenuation is measured while the plates are pressed together with a force of 30 newtons. A 70 newton force is then applied to the plates and the increase in attenuation in dB/m is measured. This increase in attenuation is the lateral load attenuation of the waveguide.

SUMMARY OF THE INVENTION

The low attenuation, large effective area waveguide fiber disclosed and described herein meets the requirements listed above and, in addition, lends itself to reproducible manufacture. The fiber usually is configured to propagate a single mode over the wavelength range of about 1530 nm to 1625 nm. Index profiles designs for use around the 1310 wavelength window are also disclosed. However the invention includes configuration of core and clad refractive index profiles that propagate more than one mode over all or part of the operating wavelength range. In the case in which more than one mode is propagated, all but the lowest order mode is strongly attenuated in the fiber. Thus the higher order modes disappear within a distance less than 1 km of fiber. Thus, in terms of typical transmission distances, the fiber effectively propagates only a single mode.

A first aspect of the invention is an optical waveguide fiber having a core region and a surrounding clad layer. The clad layer is in contact with the outside surface of the core region. The core region and clad layer are each characterized by respective refractive index profiles. That is, a value of relative index Δ(r) % is defined for each radius point of the core region and clad layer. In the case of the core region, the radius points are in the range zero, at the core centerline, to $r_o$, the radius drawn from the centerline to the interface of the core region and clad layer. At the centerline, the zero radius point, $\Delta(r)\% = \Delta_o\%$ is in the range of 0.25% to 1%. The core to clad interface radius, $r_o$, is in the range 5.8 μm to 18 μm. The value of Δ(r)% at the interface radius is zero. At radius points between the centerline and the interface, the relative index is bounded by an upper and a lower refractive index profile curve. The boundary profiles are selected so that the effective area of the waveguide is greater than or equal to 80 μm² and has attenuation less than 0.20 dB/km, where both of these values are taken at a wavelength of 1550 nm.

Figure 3:
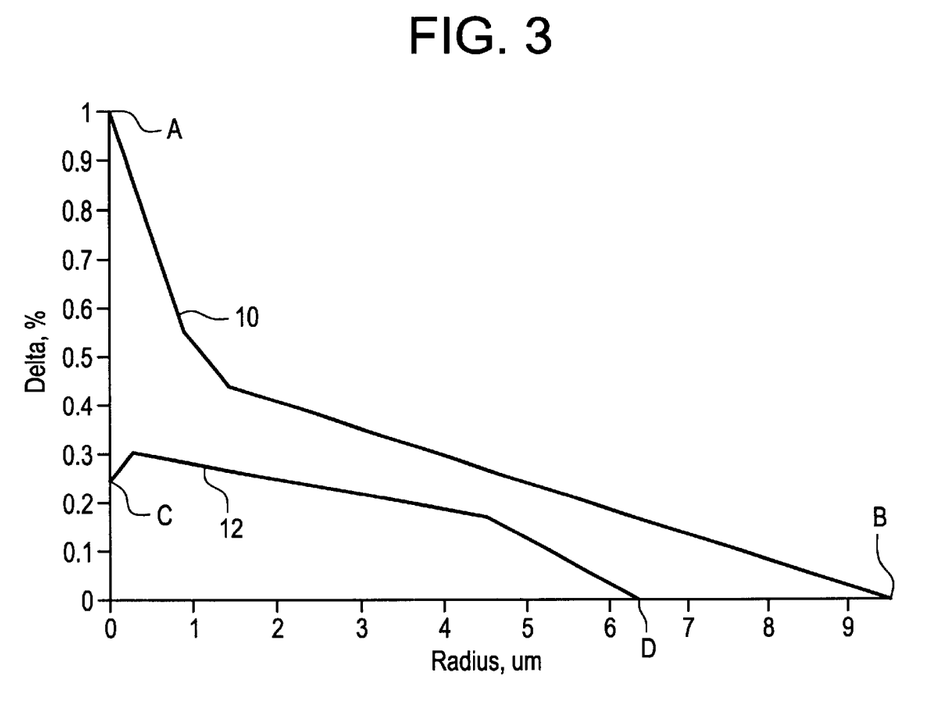
FIG. 3 is a chart of relative index percent versus radius that shows the upper and lower curves boundary curves of an embodiment of the invention.

In a first embodiment of this aspect of the invention, the respective upper and lower boundary profiles are given as curves AB and CD in FIG. 3.

Figure 4:
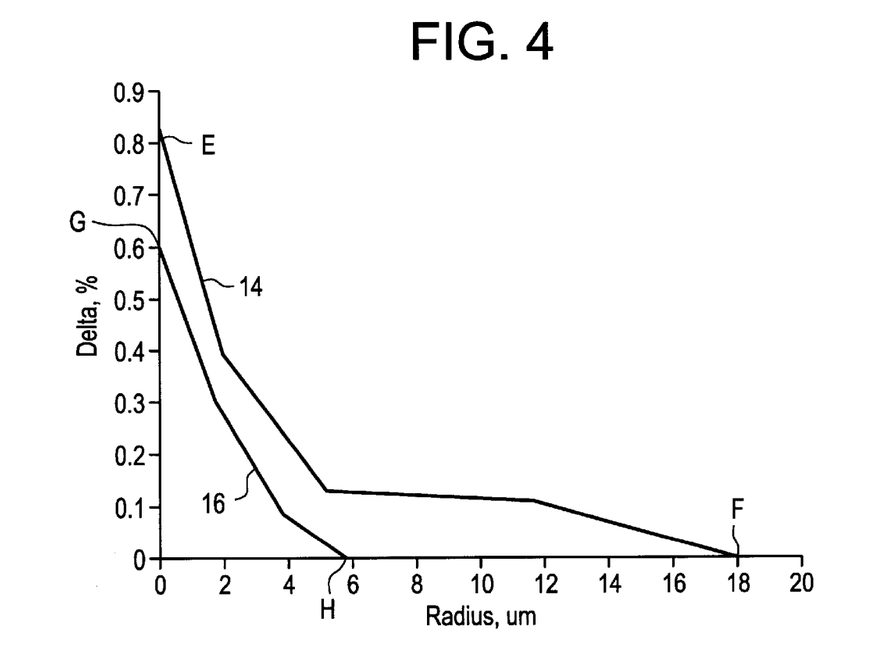
FIG. 4 is a chart of relative index percent versus radius that shows the upper and lower boundary curves of an embodiment of the invention.

In a second embodiment of the invention, the respective upper and lower boundary profiles are given as curves EF and GH in FIG. 4.

The properties of waveguide fibers made in accord with the embodiments of the first aspect of the invention are set forth in Tables 1 and 2 below.

In a second aspect of the invention, the refractive index profile of the core region is described in terms of specific values of Δ(r)% at a sufficient number of points to fully describe the core region profile. In particular, the Δ(r)% on centerline is in the range 0.8% to 0.9%. The profile shape of core region is an α-profile with α=1 over the radius range zero to 1+/−0.2 μm. The final point of α-profile has a relative index percent in the range 0.35% to 0.41 %. The remainder of the core region refractive index profile is a straight line joining the last point of the α-profile and the core to clad interface point $r_o$ on the horizontal axis. The distance from centerline to core to clad interface is in the range 9 μm to 10 μm. Waveguide fibers made in accord with this aspect are predicted to have dispersion slope at 1550 nm in the range 0.065 ps/nm²-km to 0.067 ps/nm²-km, effective area at 1550 nm in the range 100 μm² to 105 μm², and attenuation at 1550 nm in the range 0.182 dB/km to 0.186 dB/km.

A third aspect of the invention is a waveguide fiber having a relative index percent on centerline in the range 0.6% to 0.7%. The radius from the core region centerline to the core to clad interface is in the range 11.5 μm to 12.5 μm. The profile shape is defined by specifying points on the chart of relative refractive index percent versus radius Δ(r)% versus r. In particular, Δ(r)% is defined over the radius range 0≤r≤5+/−0.2 μm by the respective values, Δ(r)% at r=1+/−0.1 μm in the range 0.48% to 0.5%, Δ(r)% at r=2+/−0.1 μm in the range 0.35% to 0.37%, Δ(r)% at r=3+/−0.1 μm in the range 0.24% to 0.26%, Δ(r)% at r=4+/−0.1 μm in the range 0.14% to 0.16%, and Δ(r)% at r=5+/−0.1 μm in the range 0.05 % to 0.08%. The relative index profile is formed by connecting adjacent points by straight lines. For the remainder of the profile, Δ(r)% is a rounded step index profile in the radius range of 5+/−0.1 μm≤r≤$r_o$, and Δ(r)% at r=5+/−0.1 μm is in the range 0.05 % to 0.08%. As is stated above, the relative index percent at the $r_o$ point is zero unless stated otherwise. Waveguide fibers made in accord with this aspect of the invention are predicted to have total dispersion slope at 1550 nm in the range 0.066 ps/nm²-km to 0.068 ps/nm2-km, effective area at 1550 nm in the range 80 μm² to 85 μm², and attenuation at 1550 nm in the range 0.186 dB/km to 0.190 dB/km.

Figure 5:
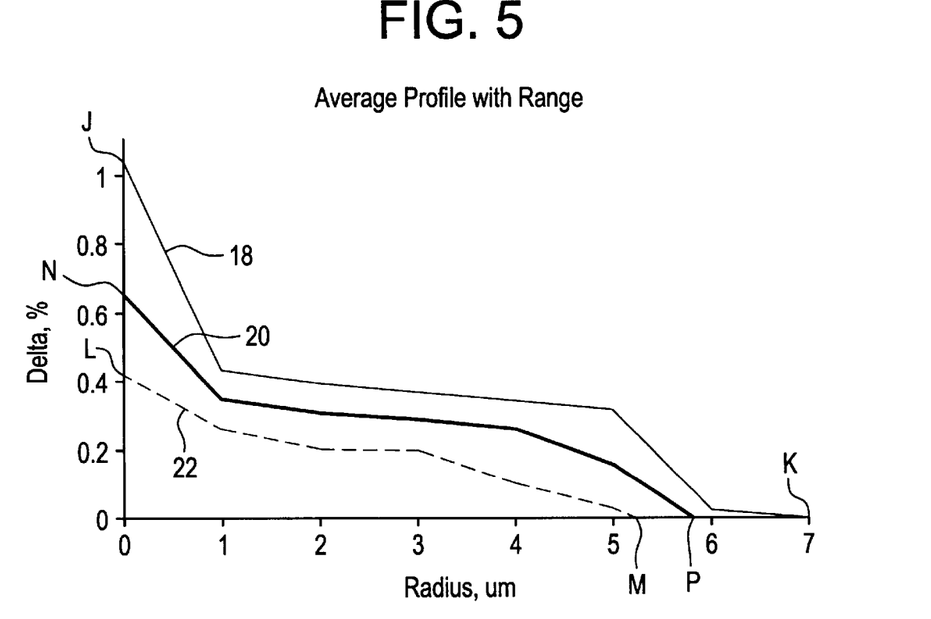
FIG. 5 is a chart of relative index percent versus radius that shows the upper and lower boundary curves and the average curve of an embodiment of the invention.

A fourth aspect of the invention is a waveguide fiber having a relative index percent on centerline in the range 0.40% to 1.05%. The radius from the core region centerline to the core to clad interface is in the range 5.3 μm to 7 μm. The remaining points of the profile, Δ(r)% for 0<r<$r_o$, are less than or equal to an upper boundary curve JK and greater than or equal to a lower boundary curve LM shown in FIG.

5. The upper and lower boundary curves are selected to provide, at 1310 nm, an effective area greater than or equal to 80 μm² and an attenuation less than 0.335 dB/km and an attenuation at 1550 nm less than 0.25 dB/km. The attenuation at 1550 nm is preferably less than 0.22 dB/km, and more preferably less than 0.20 dB/km.

The profile shape of this aspect is defined by specifying points on the chart of relative refractive index percent versus radius, i.e., Δ(r)% versus r. In particular, Δ(r)% is defined over the radius range 0≦r≦6+/−0.2 μm by the following values. Δ(r)% at r=1+/−0.2 μm is in the range 0.30% to 0.40%, and the profile shape over the radius range 0 to 1+/−0.2 μm is an α-profile having an α of in the range of 0.8 to 1.2. Δ(r)% is in the range 0.23% to 0.33% at radius 4+/−0.2 μm. Δ(r)% is a straight line in the radius range of 4+/−0.2 μm≦r≦5+/−0.2 μm and Δ(r)% is in the range 0.05% to 0.15% at radius 5+/−0.2 μm. Δ(r)% is a straight line in the radius range of 5+/−0.2 μm≦r≦6+/−0.2 μm, and, Δ(r)% is zero at radius 6+/−0.2 μm.

A fifth aspect of the invention is a waveguide fiber preform having a core region and a clad layer, each having respective refractive index profiles. A waveguide fiber is drawn from the preform. The preform refractive index profiles are selected to produce a waveguide having structure and properties in accord with any of the aspects and embodiments set forth above and claimed in any one of claims 1 through 23. The waveguide fiber dimensions scale linearly with the dimensions of the draw preform, so that the geometry of a particular size preform may be readily determined by multiplying the waveguide fiber dimensions by an appropriate constant. This constant depends upon the preselected outside diameter of the desired preform.

DETAILED DESCRIPTION OF THE INVENTION

The waveguide fiber comprises a family of core refractive index profile designs that yields a very particular set of desired functional parameters. The family of core designs disclosed and described herein are illustrated in FIGS. 3, 4, and 5. In particular in FIG. 3 are shown curves 10 and 12, also labeled as curves having respective end points AB and CD. Upper boundary curve 10 is defined by three straight line segments having respective beginning and ending points, (Δ%, r), of (1%, 0) and (0.55%, 0.9 μm) for the first segment, (0.55%, 0.9 μm) and (0.45%, 1.5 μm) for the second segment, and (0.45%, 1.5 μm) and (0, 9.6 μm) for the third segment. Lower boundary curve 12 is defined by three straight line segments having respective beginning and ending points (Δ%, r) of (0.25%, 0) and (0.30%, 0.28 μm) for the first segment, (0.30%, 0.28 μm) and (0.175%, 4.57 μm) for the second segment, and (0.175%, 4.57 μm) and (0, 6.5 μm) for the third segment. Curve 10 is the upper boundary of a set of refractive index profiles made in accord with the invention. Curve 12 is the lower boundary of a set of refractive index profiles made in accord with the invention. That is, a family of refractive index profiles that have the desired properties set forth in Table 1, lie between curves 10 and 12 of FIG. 3.

Further, FIG. 4 shows upper boundary curve 14 and lower boundary curve 16 of another family of refractive index profiles of waveguide fibers having the desired properties set forth in Table 2. Upper boundary curve 14 is defined by four straight line segments having respective beginning and ending points, (Δ%, r), of (0.83%, 0) and (0.39%, 2.0 μm) for the first segment, 0.39%, 2.0 μm) and (0.13%, 5.1 μm) for the second segment, (0.13%, 5.1 μm) and (0.12%, 11.6 μm) for the third segment, and (0.12%, 11.6 μm) and (0, 18.0 μm) for the fourth segment. Lower boundary curve 16 is defined by three straight line segments having respective beginning and ending points (Δ%, r) of (0.6%, 0) and (0.30%, 1.75 μm) for the first segment, (0.30%, 1.75 μm), and (0.085%, 3.8 μm) for the second segment, and (0.085%, 3.8 μm) and (0, 5.8 μm) for the third segment.

The upper and lower boundary curves 18 (having respective beginning and end points J and K) and 22 (having respective beginning and end points L and M), respectively, of FIG. 5 define a family of curves having the desired waveguide fiber properties set forth in Table 3. Upper boundary curve 18 is defined by four straight line segments having respective beginning and ending points, (Δ%, r), of (1.03%, 0) and (0.39%, 2.0 μm) for the first segment, (0.39%, 2.0 μm) and (0.13%, 5.1 μm) for the second segment, (0.13%, 5.1 μm) and (0.12%, 11.6 μm) for the third segment, and (0.12%, 11.6 μm) and (0, 18.0 μm) for the fourth segment. Lower boundary curve 22 is defined by four straight line segments having respective beginning and ending points (Δ%, r) of (0.41%, 0) and (0.25%, 0.98 μm) for the first segment, (0.25%, 0.98 μm) and (0.20%, 2.0 μm) for the second segment, (0.20%, 2.0 μm) and (0.20%, 3.0 μm) for the third segment, and (0.20%, 3.0 μm) and (0, 5.8 μm) for the fourth segment. Curve 20 (having respective beginning and end points N and P) of FIG. 5 is the average profile defined by the respective upper and lower boundary curves.

TABLE 1

|  | D1550 ps/nm kn | Slope 1550 nm ps/nm²kr | MFD um | Aeff um²2 | Fiber Cutoff nm | Pin Array dB | AT 1550 dB/km | Lat. Load dB/m |
|---|---|---|---|---|---|---|---|---|
| Maximum | 19.2 | 0.068 | 11.934 | 109 | 1755 | 12.6 | 0.186 | 0.97 |
| Minimum | 16.8 | 0.061 | 10.677 | 85 | 1340 | 1.0 | 0.184 | 0.62 |

The desired properties include low total dispersion slope and large effective area together with good bend resistance as shown by the pin array and lateral load tests.

In addition, as shown by the total dispersion at 1550 nm, the desired characteristics include a dispersion zero wavelength lower than the operating wavelength window of about 1530 nm to 1570 nm, referred to as the C-band. The extended operating wavelength window includes wavelengths to 1625 nm, which is the upper end of the L-band. The L-band refers to a wavelength range of about 1570 nm to 1625 nm. The total dispersion is preferably not less than about 2 ps/nm-km in the operating window and the dispersion slope is low, less than about 0.08 ps/nm$^2$-km, to insure limited power penalty due to linear dispersion. Because of the higher linear dispersion of the present waveguide fiber, longer length systems may include in their design a dispersion compensating module or cable length to reduce end to end dispersion of a link using the present fiber. The low slope provides for a total dispersion at 1625 nm, not greater than about 25 ps/nm-km. Total dispersion of less than about 16 ps/nm-km at 1625 nm has been achieved.

The non-zero total dispersion effectively eliminates FWM and the positive sign of the total dispersion offsets signal degradation due to SPM.

Figure 6:
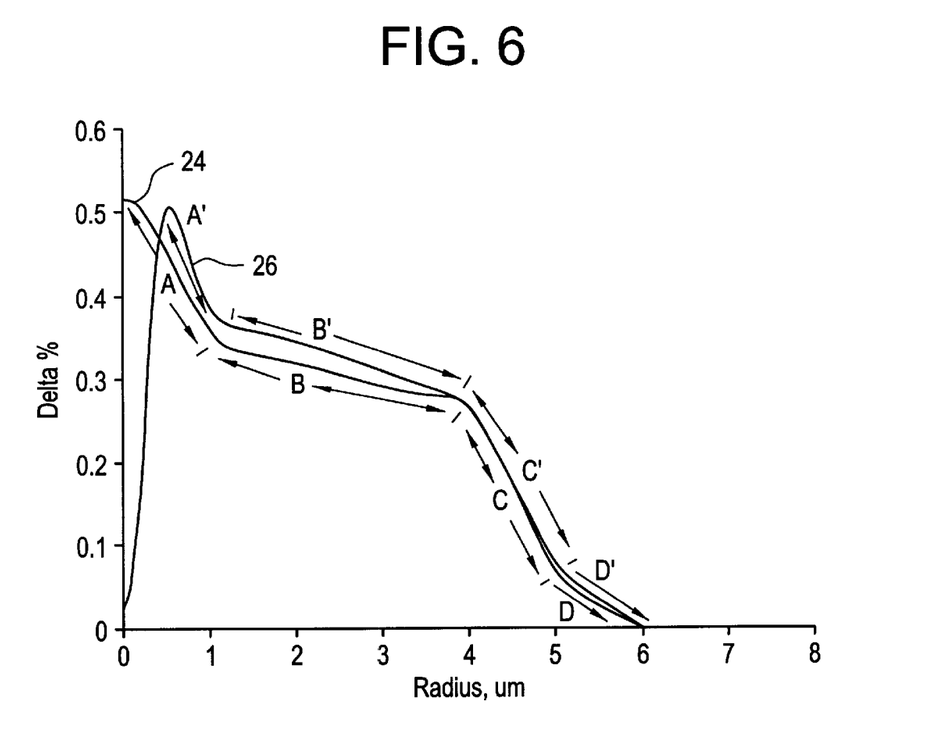
FIG. 6 is a chart of relative index percent versus radius illustrating two embodiments of the invention in accord with FIG. 5.

Tables 2, sets forth below the predicted properties of a second embodiment of the invention. Tables 1 and 2 show that despite large mode field diameter bending induced loses are as good as or better than standard step index fiber.

sloping and linear, respective portions C and C' which are steeper sloped and linear, and curved tails D and D' which exhibit an upward facing concavity.

EXAMPLE 1

Figure 1:
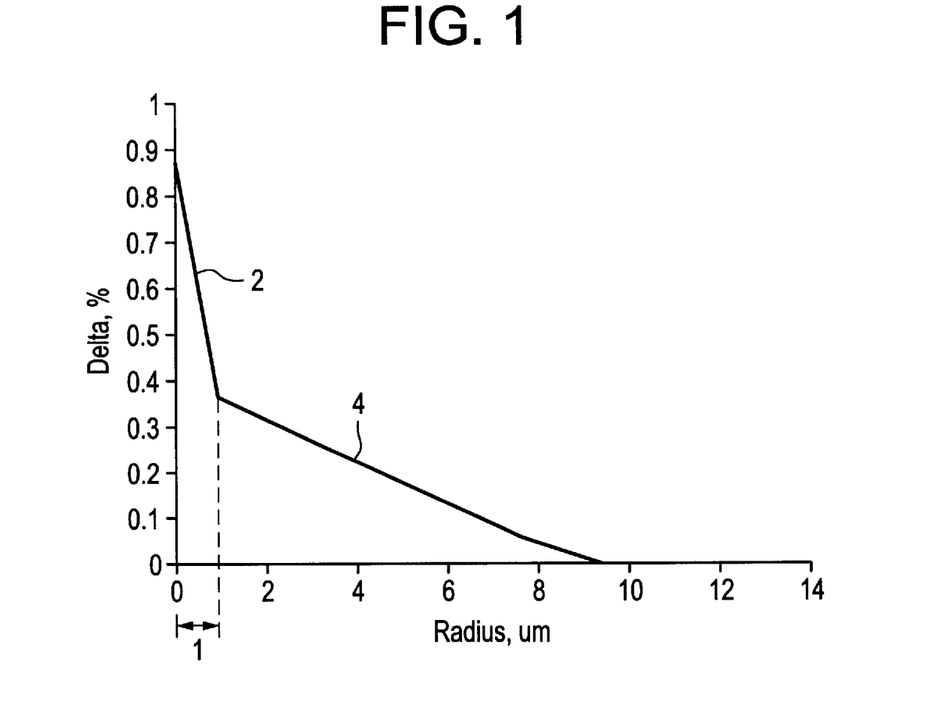
FIG. 1 is a chart of relative index percent versus radius illustrating an embodiment of the invion.

A fiber having the profile shown in FIG. 1 was modeled to find functional properties. The profile of FIG. 1 is a member of the family of profiles shown by the upper and lower boundary profiles of FIG. 3. The structural parameters may be read directly from FIG. 1 and include a portion 2 which is an α-profile having an α of about 1. The relative index percent of the α-profile begins at 0.86% at the centerline and extends to a Δ(r)% of about 0.38% at a radius 1 of about 1 μm. The straight line portion of the profile 4 begins at the last point of the α-profile and extends to intersect the horizontal axis at r$_o$ of about 9.5 μm. A waveguide fiber made in accord with FIG. 1 has the predicted properties:

total dispersion at 1550 nm of 17.9 ps/nm-km;

total dispersion slope at 1550 nm 0.066 ps/nm$^2$-km;

fiber cut off wavelength, $\lambda_c$, 1589;

mode field diameter of at 1550 nm 11.7 μm;

effective area at 1550 nm, A$_{eff}$, 103 μm$^2$; and, attenuation at 1550 nm of 0.184 dB/km.

A fiber made in accord with Example 1 was measured to have an attenuation at 1550 nm of 0.187 dB/km and a mode field diameter of 13.3 μm.

TABLE 2

|  | D1550 ps/nm km | Slope ps/nm$^2$kr | MFD um | Aeff um$^2$ | Cutoff nm | Pin Arra dB | AT 1550 dB/km | Lat. Load dB/m |
|---|---|---|---|---|---|---|---|---|
| Maximum | 13.0 | 0.070 | 10.99 | 89 | 1599 | 20 | 0.189 | 0.82 |
| Minimum | 10.9 | 0.065 | 10.44 | 80 | 1187 | 5 | 0.187 | 0.63 |

Table 3 shows the ranges of key waveguide fiber properties designed in accord with the invention and further tailored for operation in the wavelength range around 1310 nm. Because —OH ion absorption has essentially been eliminated, the operating window around 1310 can extend from 1250 nm to 1350 nm.

TABLE 3

|  | Zero of Dispersion (nm) | Dispersion Slope (ps/nm$^2$-km) | Mode Field Diameter (μm) | Cutoff Wavelength (nm) | Attenuation 1310 nm (dB/km) |
|---|---|---|---|---|---|
| Maximum | 1322 | 0.0924 | 9.8 | 1330 | 0.334 |
| Minimum | 1301 | 0.088 | 8.8 | 1180 | 0.332 |

The effective area of the Table 3 design is typically 80 μm$^2$. The bend performance of the Table 3 design is as good as or better than that of standard single mode optical waveguide fiber, such as Corning SMF-28™. The exceptionally low attenuation makes this design attractive as a means to increase capacity by adding channels in the 1310 nm wavelength window. The typical attenuation at 1550 nm for the waveguide fiber of Table 3 is 0.188 dB/km.

Preferred embodiments of the invention in accord with Table 3 are shown as curves 24 and 26 of FIG. 6. The features that distinguish the profiles 24 and 26 are respective portions A and A' which are α-profiles having α in the range 0.8 to 1.3, respective portions B and B' which are gradually

EXAMPLE 2

Figure 2:
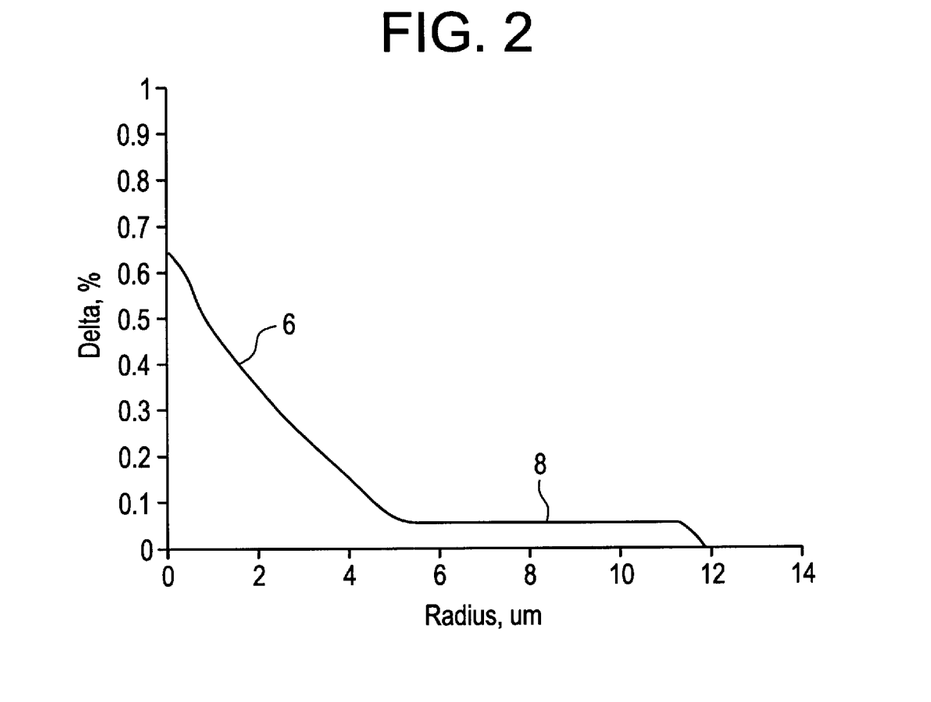
FIG. 2 is a chart of relative index percent versus radius illustrating an embodiment of the invention.

A fiber having the profile shown in FIG. 2 was modeled to find functional properties. The profile of FIG. 2 is a member of the family of profiles shown by the upper and lower boundary profiles of FIG. 4. The structural parameters may be read directly from FIG. 2 and include a portion 6 defined by the points [Δ(r)%, r] of [0.64%, 0], [0.45%, 1 μm], [0.33%, 2 μm], [0.24%, 3 μm], [0.15%, 4 μm], and [0.06%, 5.6 μm].

The step index portion of the profile 8 begins at the at 5.6 μm and extends to intersect the horizontal axis at r$_o$ of about 11.8 μm. A waveguide fiber made in accord with FIG. 1 has the predicted properties:

total dispersion at 1550 nm of 11.4 ps/nm-km;

total dispersion slope at 1550 nm 0.067 ps/nm$^2$-km;

fiber cut off wavelength, $\lambda_c$, 1515;

mode field diameter at 1550 nm of 10.6 μm effective area at 1550 nm, A$_{eff}$, 82 μm$^2$; and, attenuation at 1550 nm of 0.188 dB/km.

In each of these examples the low dispersion slope and low attenuation are expected to extend over the C and L wavelength bands that extend from 1530 nm to 1565 nm and from 1565 nm to 1625 nm, respectively.

These two examples show excellent results that meet or exceed the desired waveguide fiber properties.

Although particular examples of the novel waveguide have been disclosed and described herein, the invention is nonetheless limited only by the following claims.

I claim:

1. An optical waveguide fiber comprising:
   a core region having a refractive index profile and a centerline;
   a clad layer surrounding and in contact with the core region, said clad layer having a refractive index profile and average refractive index $n_c$;
   wherein the refractive index profile of said core region is characterized by a relative index percent $\Delta(r)\%$ which is positive and has a value at each radius point beginning at the centerline where r=0 and $\Delta(r)\%=\Delta_o\%$ and ending at $r=r_o$ at which point $\Delta(r)\%=0$; and,
   wherein relative index percent values, $\Delta(r)\%$, for $0 \leq r \leq r_o$, are less than or equal to an upper boundary curve and greater than or equal to a lower boundary curve;
   said upper and lower boundary curves being selected to provide, at 1550 nm, an effective area great than or equal to 80 $\mu m^2$ and an attenuation less than 0.20 dB/km;
   said upper boundary curve having three straight line segments having respective beginning and ending points, ($\Delta\%$, r), of (1%, 0) and (0.55%, 0.9 $\mu m$) for the first segment, (0.55%, 0.9 $\mu m$) and (0.45%, 1.5 $\mu m$) for the second segment, and (0.45%, 1.5 $\mu m$) and (0, 9.6 $\mu m$) for the third segment; and,
   said lower boundary curve having three straight line segments having respective beginning and ending points ($\Delta\%$, r) of (0.25%, 0) and (0.30%, 0.28 $\mu m$) for the first segment, (0.30%, 0.28 $\mu m$) and (0.175%, 4.57 $\mu m$) for the second segment, and (0.175%, 4.57 $\mu m$) and (0, 6.5 $\mu m$) for the third segment.

2. An optical waveguide fiber comprising:
   a core region having a refractive index profile and a centerline;
   a clad layer surrounding and in contact with the core region, said clad layer having a refractive index profile and average refractive index $n_c$;
   wherein the refractive index profile of said core region is characterized by a relative index percent $\Delta(r)\%$ which is positive and has a value at each radius point beginning at the centerline where r=0 and $\Delta(r)\%=\Delta_o\%$ and ending at $r=r_o$ at which point $\Delta(r)\% =0$; and,
   wherein relative index percent values, $\Delta(r)\%$, for $0 \leq r \leq r_o$, are less than or equal to an upper boundary curve and greater than or equal to a lower boundary curve;
   said upper and lower boundary curves being selected to provide, at 1550 nm, an effective area great than or equal to 80 $\mu m^2$ and an attenuation less than 0.20 dB/km;
   said upper boundary curve having four straight line segments having respective beginning and ending points, ($\Delta\%$, r), of (0.83%, 0) and (0.39%, 2.0 $\mu m$) for the first segment, (0.39%, 2.0 $\mu m$) and (0.13%, 5.1 $\mu m$) for the second segment, (0.13%, 5.1 $\mu m$) and (0.12%, 11.6 $\mu m$) for the third segment, and (0.12%, 11.6 $\mu m$) and (0, 18.0 $\mu m$) for the fourth segment; and,
   said lower boundary curve having three straight line segments having respective beginning and ending points ($\Delta\%$, r) of (0.6%, 0) and (0.30%, 1.75 $\mu m$) for the first segment, (0.30%, 1.75 $\mu m$), and (0.085%, 3.8 $\mu m$) for the second segment, and (0.085%, 3.8 $\mu m$) and (0, 5.8 $\mu m$) for the third segment.

3. The optical waveguide fiber of claim 1 wherein said respective core and clad refractive index profiles are configured to propagate a single mode of a light signal having a wavelength selected from the range 1340 nm to 1755 nm.

4. The optical waveguide fiber of claim 3 wherein, at a wavelength of 1550 nm, the mode field diameter is in the range of 10.68 $\mu m$ to 12 $\mu m$ and pin array induced bend loss is less than 13 dB.

5. The optical waveguide fiber of claim 4 wherein lateral load induced bend loss is less than 1 dB/m at 1550 nm.

6. The optical waveguide fiber of claim 1 wherein the total dispersion slope in the wavelength interval 1520 nm to 1625 nm is in the range of 0.06 ps/nm$^2$-km to 0.07 ps/nm$^2$-km and total dispersion at 1550 is in the range of 16 ps/nm-km to 20 ps/nm-km.

7. The optical waveguide fiber of claim 1 wherein the effective area at 1550 nm is greater than 85 $\mu m^2$.

8. The optical waveguide fiber of claim 1 wherein the effective area is at 1550 nm is greater than 95 $\mu m^2$.

9. The optical waveguide fiber of claim 2 wherein said respective core and clad refractive index profiles are configured to propagate a single mode of a light signal having a wavelength selected from the range 1180 nmn to 1600 nm.

10. The optical waveguide fiber of claim 2 wherein, at a wavelength of 1550 nm, the mode field diameter is in the range of 10.5 $\mu m$ to 11 $\mu m$ and pin array induced bend loss is less than 20 dB.

11. The optical waveguide fiber of claim 10 wherein lateral load induced bend loss at 1550 nm is less than 0.9 dB/m.

12. The optical waveguide fiber of claim 2 wherein the total dispersion slope in the wavelength interval 1520 nm to 1625 nm is in the range of 0.06 ps/nm$^2$-km to 0.07 ps/nm$^2$-km and total dispersion at 1550 is in the range of 10.9 ps/irnm-km to 13 ps/nm-km.

13. The optical waveguide fiber of claim 2 wherein the effective area is greater than 85 $\mu m^2$.

14. The optical waveguide of claim 2 wherein the effective area is in the range 80 $\mu m^2$ to 89 $\mu m^2$.

15. An optical waveguide fiber comprising:
    a core region having a refractive index profile and a centerline;
    a clad layer surrounding and in contact with the core region, said clad layer having a refractive index profile and average refractive index $n_c$;
    wherein the refractive index profile of said core region is characterized by a relative index percent $\Delta(r)\%$ which is positive and has a value at each radius point beginning at the centerline where r=0 and $\Delta(r)\%=A_o$ and ending at $r=r_o$ at which point $\Delta(r)\%=0$; and, wherein, $0.8\% \leq A_o \leq 0.9\%$ and $9 \mu m \leq r_o \leq 10 \mu m$, $\Delta(r)\%$ is a $\alpha$-profile having an a of about 1 in the radius range $0 \leq r \leq 1+/-0.2$ $\mu m$, and,
    $\Delta(r)\%$ at r=1+/-0.2 $\mu m$ is in the range 0.35% to 0.41%, and,
    $\Delta(r)\%$ is a straight line in the radius range of 1+/−0.2 $\mu m \leq r \leq r_o$.

16. The optical waveguide fiber of claim 15 wherein total dispersion slope in the wavelength interval 1520 nm to 1625 nm is 0.065 ps/nm$^2$-km to 0.067 ps/nm$^2$-km, effective area at 1550 nm is 100 $\mu m^2$ to 105 $\mu m^2$, and attenuation at 1550 nm is 0.182 dB/km to 0.186 dB/km.

17. An optical waveguide fiber comprising:
    a core region having a refractive index profile and a centerline;
    a clad layer surrounding and in contact with the core region, said clad layer having a refractive index profile and average refractive index $n_c$;
    wherein the refractive index profile of said core region is characterized by a relative index percent $\Delta(r)\%$ which is positive and has a value at each radius point beginning at the centerline where r=0 and $\Delta(r)\%=\Delta_o$ and ending at $r=r_o$ at which point $\Delta(r)\%=0$; and, wherein, $$0.6\% \leq \Delta_o \leq 0.7\% \text{ and } 11.5 \ \mu m \leq r_o \leq 12.5 \ \mu m,$$

$\Delta(r)\%$ is defined over the radius range $0 \leq r \leq 5+/-0.2$ $\mu m$ by the respective values, $\Delta(r)\%$ at $r=1+/-0.1 \ \mu m$ in the range 0.48% to 0.5%, $\Delta(r)\%$ at $r=2+/-0.1 \ \mu m$ in the range 0.35% to 0.37%, $\Delta(r)\%$ at $r=3+/-0.1 \ \mu m$ in the range 0.24% to 0.26%, $\Delta(r)\%$ at $r=4+/-0.1 \ \mu m$ in the range 0.14% to 0.16%, $\Delta(r)\%$ at $r=5+/-0.1 \ \mu m$ is in the range 0.05% to 0.08%, and $\Delta(r)\%$ is a rounded step index profile line in the radius range of $5+/-0.1 \ \mu m \leq r \leq r_o$.

18. The optical waveguide fiber of claim 17 wherein total dispersion slope over the wavelength interval 1520 nm to 1625 nm is 0.066 ps/nm²-km to 0.068 ps/nm²-km, effective area at 1550 nm is 80 $\mu m^2$ to 85 $\mu m^2$, and attenuation at 1550 nm is 0.186 dB/km to 0.190 dB/km.

19. An optical waveguide fiber comprising:

a core region having a refractive index profile and a centerline;

a clad layer surrounding and in contact with the core region, said clad layer having a refractive index profile and average refractive index $n_c$;

wherein the refractive index profile of said core region is characterized by a relative index percent $\Delta(r)\%$ which is positive and has a value at each radius point beginning at the centerline where r=0 and $\Delta(r)\%=\Delta_0\%$ and ending at $r=r_o$ at which point $\Delta(r)\%=0$; and, wherein relative index percent values $\Delta(r)\%$ for $0 \leq r \leq r_o$, are less than or equal to an upper boundary curve and greater than or equal to a lower boundary curve;

said upper and lower boundary curves being selected to provide, at 1310 run, an effective area greater than or equal to 80 $\mu m^2$ and an attenuation less than 0.335 dB/km and an attenuation at 1550 nm less than 0.25 dB/km, said upper boundary curve having four straight line segments having respective beginning and ending points, ($\Delta\%$, r), of (1.03%, 0) and (0.39%, 2.0 $\mu m$) for the first segment, (0.39%, 2.0 $\mu m$) and (0.13%, 5.1 $\mu m$) for the second segment, (0.13%, 5.1 $\mu m$) and (0.12%, 11.6 $\mu m$) for the third segment, and (0.12%, 11.6 $\mu m$) and (0, 18.0 $\mu m$) for the fourth segment; and, said lower boundary curve having four straight line segments having respective beginning and ending points ($\Delta\%$, r) of (0.41%, 0) and (0.25%, 0.98 $\mu m$) for the first segment, (0.25%, 0.98 $\mu m$) and (0.20%, 2.0 $\mu m$) for the second segment, (0.20%, 2.0 $\mu m$) and (0.20%, 3.0 $\mu m$) for the third segment, and (0.20%, 3.0 $\mu m$) and (0, 5.8 $\mu m$) for the fourth segment.

20. The optical waveguide fiber of claim 19 wherein;

$$0.40\% \leq \Delta_o \leq 0.75\% \text{ and } 4.8 \ \mu m \leq r_o \leq 6.8 \ \mu m,$$

$\Delta(r)\%$ is a $\alpha$-profile having an a of about 1 in the radius range $0 \leq r \leq 1+/-0.2 \ \mu m$, and, $\Delta(r)\%$ at $r=1+/-0.2 \ \mu m$ is in the range 0.30% to 0.40%, $\Delta(r)\%$ is a straight line in the radius range of $1+/-0.2 \ \mu m \leq r \leq 4+/-0.2 \ \mu m$, $\Delta(r)\%$ is in the range 0.23% to 0.33% at radius $4+/-0.2 \ \mu m$, $\Delta(r)\%$ is a straight line in the radius range of $4+/-0.2 \ \mu m \leq r \leq 5+/-0.2 \ \mu m$, $\Delta(r)\%$ is in the range 0.05% to 0.15% at radius $5+/-0.2 \ \mu m$, $\Delta(r)\%$ is a straight line in the radius range of $5+/-0.2 \ \mu m \leq r \leq 6+/-0.2 \ \mu m$, and, $\Delta(r)\%$ is zero at radius $6+/-0.2 \ \mu m$.

21. An optical waveguide preform comprising:

a core region having a refractive index profile;

a clad layer having a refractive index profile and surrounding and in contact with said core region; wherein, said core region and said clad layer of the preform are configured such that the preform can be drawn in a waveguide fiber having structure or properties in accord with any one of claims 1–18.

* * * * *

UNITED STATES PATENT AND TRADEMARK OFFICE
CERTIFICATE OF CORRECTION

PATENT NO.   : 6,490,396 B1
DATED        : December 3, 2002
INVENTOR(S)  : Smith, David K.

It is certified that error appears in the above-identified patent and that said Letters Patent is hereby corrected as shown below:

Column 6,
Line 44, "(1.03%, 0) and (0.39%, 2.0 µm) for the first segment" should be -- (1.04%, 0) and (0.43%, 1) for the first segment --
Line 45, "(0.39%, 2.0 µm) and (0.13%, 5.1 µm) for the second" should be -- (.043%, 1) and (0.35%, 5) for the second --
Line 46, "segment, (0.13%, 5.1 µm) and (0.12%, 11.6 µm) for the third" should be -- segment, (0.35%, 5) and (0.03%, 6) for the third --
Line 47, "segment, and (0.12%, 11.6 µm) and (0, 18.0 µm) for the" should be -- segment, and (0.03%, 6) and (0, 7.0 µm) for the --

Column 9,
Line 41, "ning at the centerline where r=0 and $\Delta(r)\%=\Delta_o,\%$ and" should be -- ning at the centerline where r=0 and $\Delta(r)\%=\Delta_o\%$ and --

Column 10,
Line 1, "4. The optical waveguide fiber of claim 3 wherein, at a" should be -- 4. The optical waveguide fiber of claim 1 wherein, at a --
Line 31, "ps/irnm-km to 13 ps/nm-km." should be -- ps/nm-km to 13 ps/nm-km. --
Line 45, "ning at the centerline where r=0 and $\Delta(r)\%=A_o$ and" should be -- ning at the centerline where r=0 and $\Delta(r)\%=\Delta_o$ and --
Line 48, "$\Delta(r)\%$ is a $\alpha$ –profile having an a of about 1 in the radius" should be -- $\Delta(r)\%$ is a $\alpha$ –profile having an $\alpha$ of about 1 in the radius --

Column 11,
Line 32, "ending at r=$r_o$ at which point A(r)%=0; and," should be -- ending at r=$r_o$ at which point $\Delta(r)\%=0$; and, --
Line 37, "provide, at 1310 run, an effective area greater than or" should be -- provide, at 1310 nm, an effective area greater than or"

Column 12,
Line 1, "($\Delta\%$, r) of (1.03%, 0) and (0.39%, 2.0 µm) for the first" should be -- ($\Delta\%$, r) of (1.04%, 0) and (0.43%, 1) for the first --
Line 2, "segment, (0.35%, 2.0 µm) and (0.13%, 5.1 µm) for the" should be -- segment, (0.43%, 1) and (0.35%, 5) for the --

UNITED STATES PATENT AND TRADEMARK OFFICE
CERTIFICATE OF CORRECTION

PATENT NO. : 6,490,396 B1
DATED : December 3, 2002
INVENTOR(S) : Smith, David K.

It is certified that error appears in the above-identified patent and that said Letters Patent is hereby corrected as shown below:

Column 12 (cont'd),
Line 3, "second segment, (0.13%, 5.1 $\mu$m) and (0.12%, 11.6 $\mu$m)" should be
-- second segment, (0.35%, 5) and (0.03%, 6) --
Line 4, "for the third segment, and (0.12%, 11.6 $\mu$m) and (0," should be -- for the third segment, and (0.03%, 6) and (0, --

Signed and Sealed this

Twelfth Day of August, 2003

JAMES E. ROGAN
*Director of the United States Patent and Trademark Office*